ROBERT PILLING, OF WATERFORD, NEW YORK.

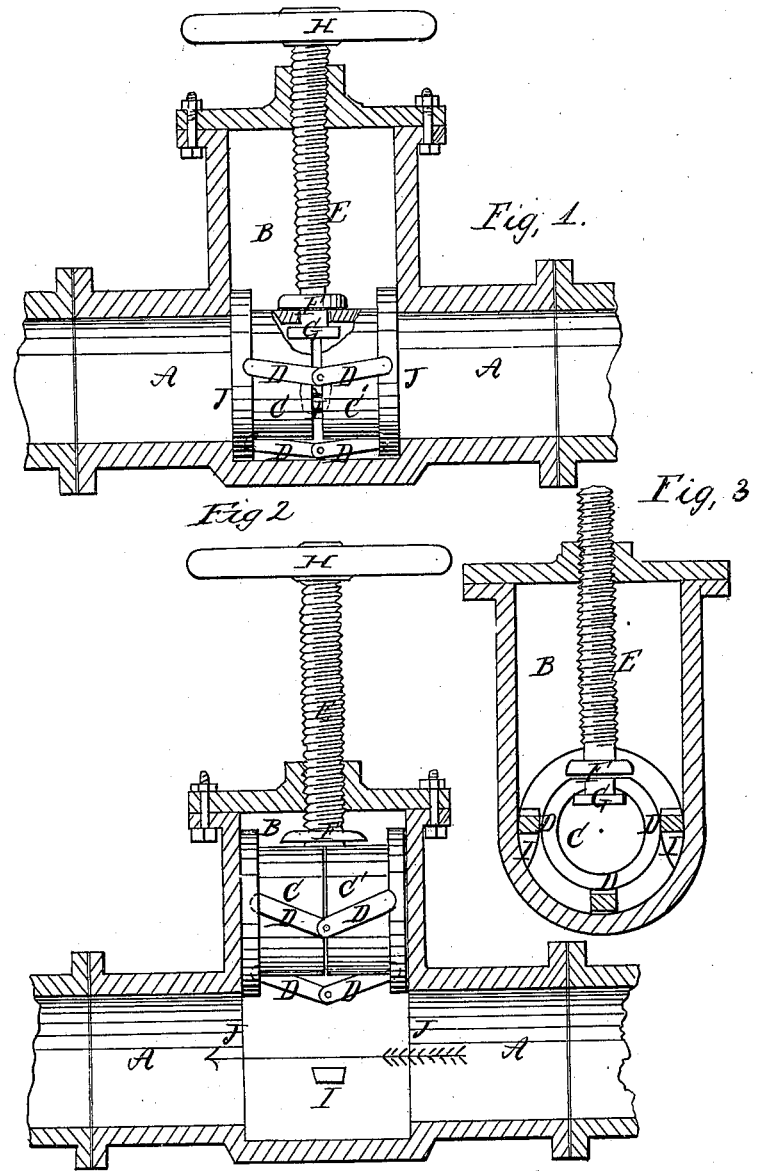

Letters Patent No. 89,071, dated April 20, 1869.

---

IMPROVEMENT IN STOP-VALVES FOR STEAM AND OTHER ENGINERY.

---

The Schedule referred to in these Letters Patent and making part of the same.

---

*To all whom it may concern:*

Be it known that I, ROBERT PILLING, of Waterford, in the county of Saratoga, and State of New York, have invented certain new and useful Improvements in Stop-Valves for Water, Steam, and Gas-Pipes; and I do hereby declare that the following is a full and exact description of the same, reference being had to the annexed drawings, and letters of reference marked thereon, making a part of this specification, in which—

Figure 1 is a vertical sectional elevation, showing the valve as closed;

Figure 2 is a similar view, but with the valve opened; and

Figure 3 is a transverse vertical section, made through the central part of the valve and its chamber, or box.

The same letters refer to like parts in each of the said figures.

My invention consists in a new and improved arrangement, relatively to each other, of a double-faced, or expanding stop-valve, toggle-joint levers, fulcrum-stops, and actuating screw-stem, or spindle, within the stop-valve chamber of water, steam, and gas-pipes, in manner substantially and operating as hereinafter fully described and shown.

To enable others skilled in the art to make and use my invention, I now proceed to fully describe its construction and operation, which are as follows:

In the annexed drawings—

A A represent a section of pipe; and

B, the chamber, or box for a stop-valve thereto, and operating therein, which is a double-faced and expanding valve, composed of two parts C and C', made in the form respectively and arranged together in manner substantially as shown in figs. 1 and 3 of the annexed drawings; and said valve is raised and lowered in its box, or chamber, by means of a screw-stem, E, or, in some instances, a rod, or spindle may be used instead.

This screw-stem E is attached to the upper side of said valve, by notching equally each part of the back edge thereof, so as to form an opening therein to receive the neck of the screw-stem E, which being placed therein, with the head G thereof below the notch, or opening, and the shoulder F thereof, above said opening in the valve, as shown in figs. 1 and 3, thus secures said valve to said stem, and so as to be raised and lowered thereby by means of a hand-wheel, H, which turns the screw-stem E, in a nut made in the cover, or cap-plate of said chamber B.

D D are "knuckle"-hinged levers, being together in length somewhat longer than the valve C C', to which they are attached by forming sockets or bearings on the back side edge of the valve's faces, which sockets receive the ends of said "knuckle"-levers, which are arranged therein, with the joint part of the lever, so as to bend downward, in manner as shown in fig. 2.

I I are fulcrum-blocks, affixed or cast to the lower part of the valve-chamber, in position substantially as shown in figs. 2 and 3.

This improved stop-valve is operated to shut and close tightly the passage-way of the pipe A A, by turning the hand-wheel H, so as to drive the screw-stem E downward in its nut, or box, which thus carries the valve C C', with its "knuckle"-levers D D, down with it, and, when near the end of the down-movement, the "knuckle"-levers D D, at its sides, bear respectively on the fulcrum-blocks I I, aforesaid, and the knuckle-lever, at the under side of the valve, bears upon the bottom of the valve-chamber. The screw-stem E, being now set down firmly, so as to press the shoulder F of the stem down on the top of the valve, which thereby causes said "knuckle"-levers D D to expand the valve outward, between and on to its seats J J', and hold it tightly and securely thereon, in manner as shown in fig. 1.

This manner of closing the passage-way of pipes by an expanding double-faced, double-seated valve, relieves the chamber, or box B of the valve from all pressure of fluids in the pipe A, when said valve is tightly closed, thereby enabling this improved valve to withstand a very great pressure of fluids within the pipe, without said pressure extending to and straining the valve-chamber, or box B, or of leakage thereabouts or therefrom, in consequence of such great pressure.

To open this valve, turn the screw-stem E so as to move it upward. The first few turns of the stem relieve the valve of the closing-pressure of the "knuckle"-levers D D aforesaid. It then moves easily upward, without friction on its seats, into its box, or chamber B, carrying up with it the "knuckle"-levers D D, so as to leave a clear, unobstructed, passage-way for fluids through the pipe, as shown in fig. 2 of annexed drawings.

Having thus fully described my improved stop-valve, What I claim as of my invention, and desire to secure by Letters Patent, is—

The arrangement of the toggle-joint levers D D, between and with reference to the valves C and C', fulcrum-stops I, and actuating screw-stem, or spindle E, substantially as shown and set forth.

ROBERT PILLING.

Witnesses:
WM. HOLROYD,
J. J. SAVAGE.